United States Patent Office 3,592,801
Patented July 13, 1971

3,592,801
FREE-FLOWING FUSED BEADS OF THERMOPLASTIC POLYMERS
Jerry D. Ilavsky and Richard W. Ford, Sarnia, Ontario, Canada, assignors to The Dow Chemical Company, Midland, Mich.
No Drawing. Filed Dec. 12, 1968, Ser. No. 783,412
Int. Cl. C08f *15/04;* C08d *3/04, 5/02*
U.S. Cl. 260—88.2                                    14 Claims

ABSTRACT OF THE DISCLOSURE

Free-flowing fused beads of normally solid, thermoplastic organic polymers such as polyethylene are prepared by (1) suspending a fine powder of the thermoplastic polymer in an aqueous medium containing a small amount of a non-reactive, insoluble suspending agent such as zinc oxide, (2) heating the resulting suspension to a temperature at or above the melting point of the polymer while subjecting the suspension to agitation and (3) cooling the suspension under continued agitation.

BACKGROUND OF THE INVENTION

This invention relates to the preparation of free-flowing fused thermoplastic beads by agglomeration of small particles of thermoplastic polymer powders that are generally poor flowing and have low bulk densities.

Dry, free-flowing powders of thermoplastic polymers are used extensively in the production of thin sheets, films, coatings and especially rotationally molded articles.

Powders currently used for such purposes are often prepared by melting low density polymer particles to fuse the polymer into a single mass that is substantially free of dissolved gas and then grinding the mass into a fine powder. This process is expensive and usually produces rough, irregular particles which are not free-flowing. In addition, the resulting powders have low bulk densities and are not ideally suited for the above purposes.

A method recently proposed for preparing high bulk density powders of poly-α-olefins is described in U.S. Pat. 3,189,588. According to this method the bulk density of a solid poly-α-olefin is increased by slurrying in water a low bulk density polymer powder containing residual inert organic liquid solvent, heating the slurry to 5 to 15° C. below the Vicat softening point and removing the solvent rapidly by azeotroping with water. Other methods for preparing free-flowing powders of organic polymer require that the polymer be dissolved in an inert, organic solvent and then precipitated by the removal of the solvent. In many instances the presence of solvents during the preparation of free-flowing powders is undesirable, primarily because their removal is difficult and time consuming.

Since the use of solvent in conventional methods is the cause of many problems and considerable expense, it would be highly desirable to provide an inexpensive method which does not require dissolving the polymer in a solvent in order to prepare dry free-flowing powders of thermoplastic organic polymers.

SUMMARY OF THE INVENTION

In accordance with the present invention, free-flowing fused beads of normally solid, thermoplastic organic polymers are prepared by a method, hereinafter described in detail, comprising the steps of (1) suspending a fine powder of a normally solid, water-insoluble, thermoplastic organic polymer in an aqueous medium containing from about 0.05 to about 20 weight percent based on the polymer of a suspending agent which is essentially non-reactive with and insoluble in the medium and the polymer, (2) heating the resulting suspension to a temperature being at least at the melting point of the polymer while subjecting the suspension to agitation and (3) cooling the suspension of substantially spheroidal, free-flowing fused beads greater in size, usually from about 2 to about 100 times, than the powder particles from which they were made. In addition, such beads usually have a bulk density ranging from about one half to three times that of the starting powder.

Beads produced in the practice of this invention are useful in static or fluidized dip coating, spraying, dusting and flame spraying applications. They can also be used in the preparation of molded or formed shapes particularly by means of a rotational molding process. In addition, such beads eliminate the need for expensive specialized extruders needed to accept the powders produced in some polymerization processes.

DESCRIPTION OF THE PREFERRED EMBODIMENTS

The process of this invention requires, as starting materials, finely divided particles of a normally solid, water-insoluble, thermoplastic organic polymer; an aqueous suspending medium; and an essentially non-reactive, insoluble suspending agent.

Free-flowing fused beads of any thermoplastic water-insoluble organic polymer may be prepared by this invention. Examples include the polymers of α-olefins and halo substituted α-olefins such as ethylene, propylene, 1-butene, 1-hexene, vinyl chloride and the like; polymers of monovinylidene aromatic compounds such as styrene, ar-methylstyrene, α - methylstyrene, t - butystyrene and the like; polymers of the alkyl acrylates and derivatives thereof, such as ethyl acrylate, methyl methacrylate, n-butyl acrylate, acrylonitrile and the like; polymers of other ethylenically unsaturated monomers such as vinyl acetate and the like; and copolymers of above-listed monomers such as ethylene and butene-1, ethylene and ethyl acrylate, styrene and butyl acrylate, ethyl acrylate and methyl methacrylate, α-methyl styrene and 2-ethylhexyl acrylate and the like. Methods for the preparation of these polymers and copolymers are described fully in Schildknecht, Polymer Processes, vol. X (1956).

Aqueous media suited for the purposes of this invention include water and aqueous solutions of various surfactants, wetting agents and the like. The presence of surfactant in the aqueous medium is optional; however, the use of surfactant is often desirable as a means of controlling particle size. When used, the surfactant is usually present in small amounts ranging from about 0.001 to about 1.0 weight percent based on the polymer. Preferred amounts of surfactant vary with the particle size desired, the particular surfactant used, type of suspending agent and polymer type. Generally an increase in the amount of surfactant results in the formation of smaller beads. Surfactants which may be used are the known water-soluble surface active agents, particularly the anionic-type, for example, the sulfated and sulfonated compounds, soaps of monocarboxylic acids and the like. Specifically the sulfated and sulfonated compounds include sodium dodecyl benzene sulfonate, sodium oleyl sulfate, ammonium dodecyl sulfonate, potassium lauryl sulfate, the alkali salts of sulfonated polystyrene and the like. Specific examples of soaps of monocarboxylic acids include sodium laurate, calcium stearate, potassium palmitate and the like. Non-ionic surfactants which may be utilized include the polyoxyethylene ethers of the higher fatty alcohols, the alkyl phenols and others set forth in Becher, Emulsions: Theory and Practice, 2nd ed., Reinhold Publishing Corporation, New York, 221–225 (1965). Ampholytic surfactants such as disodium-N - tallow-$\beta$-iminodipropionate and cationic surfactants such as octadecylammonium chloride and others described in Becher, supra, on page 221 are also suitable.

Suspending agents preferred for use in this invention are inorganic compounds in the form of water-insoluble powders or precipitates which are also insoluble in and substantially non-reactive with the thermoplastic organic polymer. Preferred examples which are insoluble in suitable aqueous media include kaolin, barium sulfate, zinc oxide, talcum, aluminum hydroxide, tricalcium phosphate, neutral calcium oxalate, titanium dioxide, insoluble and slightly soluble neutral phosphates, hydrated complex magnesium silicates and colloidal clays. Other agents such as the natural polymeric agents, modified natural polymeric agents such as methyl cellulose, synthetic polymeric agents, low molecular compounds, and combination agents listed on pp. 78–81 of Schildknecht, Polymer Processes, vol. X, (1956), are operable, but the above-listed inorganic agents are preferred. Suspending agents are used in amounts ranging from about 0.05 weight percent to about 20 weight percent based on the polymer, with preferred amounts varying with the particular agent used and desired size. As an illustration, a level of 10 weight percent of zinc oxide and 50 p.p.m. disodium - N - tallow - $\beta$ - iminodipropionate are used when particles of about .100–.400 millimeter are desired whereas 4 weight percent of tricalcium phosphate and 50 p.p.m. of the same surfactant are sufficient for producing the same size particle.

The method of this invention is carried out by (1) dispersing the starting fine powder particles of the thermoplastic organic polymer in an aqueous suspending medium containing a specified amount of a suitable suspending agent, (2) heating the dispersion to a temperature at or above the melting point of the polymer while agitating the medium and (3) cooling the medium under continued agitation.

For the purposes of this invention, the ratio of suspending medium to polymer powder is such that a stirrable slurry results. Good results, i.e., particles having a more uniform size and rounded shape, are obtained with medium-to-powder ratios ranging from about 1:2 to about 30:1 by weight, with the best results obtained in suspensions having medium-to-powder ratios from about 5:1 to about 10:1.

The polymer powder is dispersed in the suspending medium, i.e., an aqueous liquid containing 0.05 to 20 percent of a suitable suspending agent, with any conventional mixing apparatus, for example, a baffled tank equipped with stirrer means.

The suspension is heated to a temperature at or above the crystalline melting point of the polymer, but low enough to avoid degradation of the polymer. It is necessary to maintain the suspension at these temperatures for a period sufficient to permit the initial particles to become molten. In preferred embodiments the suspension is maintained above the melting point for 5 minutes or more. It is also generally desirable to conduct the heating step in a closed vessel and at pressures sufficient to maintain the suspending medium in the liquid state. Pressures from about 20 to about 200 pound per square inch (p.s.i.) are generally sufficient to accomplish this end.

Throughout the heating step the suspension is agitated at a rate such that the molten particles are not permitted to coagulae into a single mass. The desired rate for a particular system can be readily determined by the skilled artisan. As an illustration of the invention and not for the purposes of limitation, the rates of agitation suitable for small reaction vessels equipped with loop stirrers and having a total volume from about 5 to 10 liters range from about 200 to 1400 r.p.m. In preferred embodiments, the agitation has an up-and-down motion in addition to centrifugal motion which keeps the molten polymer dispersed throughout the suspending medium. This desired up-and-down portion is accomplished with pitched blade stirrers; however, adequate up-and-down motion can also be achieved with loop stirrers and the like. As a general rule, the particular rate of agitation affects particle size to some extent but has less influence than the suspending agent and surfactant so long as it is sufficient to prevent coagulation into a single mass.

The initially formed molten droplets of polymer agglomerate and coalesce to form larger spheroidal droplets. As these droplets reach the desired size, the suspension is cooled while continuing the same rate of agitation used in the heating step. The method of cooling and rate of cooling are not critical in the practice of invention so long as the specified agitation rate is maintained until the molten droplets solidify.

The resulting beads are separated from suspending medium and then washed to remove suspending agent. In one embodiment, 0.1 N HCl is used to remove zinc oxide and tricalcium phosphate, followed by a water rinse to remove the acid.

In most embodiments the resulting beads are fused solid spheroids having virtually no porosity and average diameters substantially greater than that of the starting particles, in some instances, up to about 5 millimeters. However, under certain conditions, the resulting beads are actually agglomerates of smaller particles, said agglomerates having void spaces therein. In such instances, the beads are free-flowing and have increased size, but do not have substantially increased bulk densities.

The following examples are given to illustrate the invention and are not intended to limit the scope thereof. All parts and percentages in the specification and claims are weight percentages unless otherwise indicated.

EXAMPLE 1

A 300-gram portion of linear polyethylene (Melt Index=12, molded density=0.953) having an average particle diameter of less than .075 mm. and bulk density of 16 pounds per cubic foot is charged to a 6 liter agitated, baffled, steel reactor, 7 inches in diameter and 10 inches deep with four ½ inch baffles on the walls thereof. The reactor is equipped with a pitched blade stirrer and contains 3 liters of water, 30 grams of ZnO and 0.015 gram of disodium-N-tallow-$\beta$-iminodipropionate. The resulting mixture is agitated at 1200 r.p.m. and heated with stirring to 140° C. at which point the pressure of the reactor is 50 to 60 p.s.i. These conditions are held for 2 hours after which the mixture is cooled. The resulting particles, after separating from the medium by centrifuging, washing with 0.1 N HCl, rinsing with water, and drying, are found to be free-flowing fused beads having a bulk density of 26.5 lbs./ft.$^3$ and an average bead diameter of about 0.250 to 0.840 mm.

EXAMPLES 2–6

Numerous samples of beads are prepared by following the procedure of Example 1 except that an ethylene/butene-1 copolymer powder is dispersed in an aqueous medium having varied amounts and types of suspending agents and then heated at a maximum temperature for different periods of time. The bead size and bulk density of each sample are shown in Table I. For the purposes of comparison and to particularly point out the advantages of this invention, the bulk density and particle size of the starting raw powder, designated C, are also listed in Table I.

TABLE I

| Example No. | Water ml. | Polymer powder, g. | Suspending agent Type | Suspending agent g. | Surfactant, g. | Temp., °C. | Time held at max. temp., hr. | Bulk density, lb./cu.ft. | Bead size, mm.[2] |
|---|---|---|---|---|---|---|---|---|---|
| C [1] | | | | | | | | 16 | 90% in 0–0.125. |
| 2 | 3,000 | 150 | ZnO | 30 | 0.015 | 140 | 1.5 | 35 | 87% in 0–0.150. |
| 3 | 3,000 | 300 | ZnO | 30 | 0.015 | 140 | 2.5 | 32 | 86% in 0.050–0.420. |
| 4 | 3,000 | 300 | ZnO | 10 | 0.015 | 134 | 0.1 | 18 | 96% in 0.250–0.841. |
| 5 | 3,000 | 300 | $TiO_2$ | 30 | 0.015 | 140 | 1.5 | 32 | 88% in 0.125–0.420. |
| 6 | 3,000 | 300 | $TiO_2$ | 10 | 0.015 | 134 | 1.5 | 31 | Approx. 1–5 mm. very irregular shape. |
| | 3,000 | 300 | $Ca_3[PO_4]_2$ | 6 | 0.015 | 134 | 0.1 | 31 | 96% in 0.50–1.41. |

[1] Not an example of the invention.
[2] Bead size is the average diameter of the beads as determined by screen analysis where the proportion of beads passing through a screen of predetermined mesh size is measured. Screens having mesh sizes of 0.044, 0.074, 0.125, 0.149, 0.250, 0.420, 0.500, 0.841, 1.410, 2.000 and 4.000 millimeters were used.

EXAMPLES 7–8

Samples of polystyrene and polypropylene are treated according to the procedure of Example 1 except that a temperature of 170° C. is used in the case of polypropylene. Polymeric beads produced thereby are free-flowing, fused spheroids having increased size and bulk density over their respective starting powders.

What is claimed is:

1. A method for preparing free-flowing fused beads of a normally solid, water-insoluble thermoplastic organic polymer, comprising (1) suspending a powder of the thermoplastic polymer in an aqueous medium in proportions such that a stirrable slurry results, the aqueous medium containing from about 0.05 to about 20 weight percent based on the polymer of a solid suspending agent, said agent being insoluble in and substantially non-reactive with the polymer and the medium; (2) heating the resulting suspension to a temperature between the melting point and degradation point of the polymer while agitating the suspension at a rate only sufficient so that the molten polymer does not coagulate into a single mass; and (3) cooling the suspension until the resulting molten polymer solidifies while continuing the agitation, the resulting beads having greater size than the particles of the powder.

2. The method according to claim 1 wherein the polymer is linear polyethylene.

3. The method according to claim 1 wherein the polymer is an ethylene/butene-1 copolymer.

4. The method according to claim 1 wherein the polymer is polypropylene.

5. The method according to claim 1 wherein the polymer is polystyrene.

6. The method according to claim 1 wherein the suspending agent is an inorganic suspending agent in the form of a powder.

7. The method according to claim 6 wherein the suspending agent is zinc oxide.

8. The method according to claim 1 wherein a surfactant is used in addition to the suspending agent.

9. The method according to claim 8 wherein the surfactant is disodium-N-tallow-$\beta$-iminodipropionate.

10. The method according to claim 1 wherein the resulting suspension is heated for a period of at least 5 minutes.

11. The method according to claim 1 for preparing free-flowing fused beads of a normally solid, water-insoluble thermoplastic organic polymer selected from the group consisting of the homopolymers and copolymers of the following monomers; $\alpha$-olefins, monovinylidene aromatic compounds, alkyl acrylates and derivatives thereof, and vinyl acetate comprising the steps of (1) suspending a powder of the thermoplastic polymer in an aqueous medium in proportions such that a stirrable slurry results, the aqueous medium containing from about 0.05 to about 20 weight percent based on the polymer of a solid, inorganic suspending agent, said agent being insoluble in and substantially non-reactive with the polymer and the medium; (2) heating the resulting suspension to a temperature between the melting point and degradation point of the polymer while agitating the suspension at a rate only sufficient so that the resulting molten polymer does not coagulate into a single mass; and (3) cooling the suspension until the resulting molten polymer solidifies while continuing the agitation, the resulting beads having greater size than the particles of powder.

12. The method according to claim 11 wherein the thermoplastic organic polymer is selected from the group consisting of homopolymers and copolymers of $\alpha$-olefins and halo-substituted $\alpha$-olefins.

13. The method according to claim 11 wherein the thermoplastic organic polymer is selected from the group consisting of polyethylene, polypropylene and ethylene/butene-1 copolymers.

14. The method according to claim 13 wherein the ratio of medium to powder is in the range from about 1:2 to about 30:1 by weight.

References Cited

UNITED STATES PATENTS

| | | | |
|---|---|---|---|
| 3,422,049 | 1/1969 | McClain | 260—29.6 |
| 3,432,483 | 3/1969 | Peoples et al. | 260—29.6X |
| 3,462,380 | 8/1969 | Ronden et al. | 260—93.5X |

JOSEPH L. SCHOFER, Primary Examiner

W. F. HAMROCK, Assistant Examiner

U.S. Cl. X.R.

260—86.1, 86.7, 89.1, 89.5, 92.8, 93.5, 93.7, 94.9